(12) United States Patent
Lanati

(10) Patent No.: US 10,144,629 B2
(45) Date of Patent: Dec. 4, 2018

(54) DEVICE FOR PROTECTING A LIQUID FROM OXIDATION

(71) Applicant: ENOSIS SRL, Fubine (AL) (IT)

(72) Inventor: Donato Lanati, Cuccaro Monferrato (IT)

(*) Notice: Subject to any disclaimer, the term of this patent is extended or adjusted under 35 U.S.C. 154(b) by 0 days.

(21) Appl. No.: 14/758,959

(22) PCT Filed: Jan. 15, 2014

(86) PCT No.: PCT/IB2014/058286
§ 371 (c)(1),
(2) Date: Jul. 1, 2015

(87) PCT Pub. No.: WO2014/115062
PCT Pub. Date: Jul. 31, 2014

(65) Prior Publication Data
US 2016/0002019 A1    Jan. 7, 2016

(30) Foreign Application Priority Data
Jan. 24, 2013   (IT) .............................. GE2013A0010

(51) Int. Cl.
*B67D 1/04*        (2006.01)
*C12H 1/22*        (2006.01)
(Continued)

(52) U.S. Cl.
CPC ............. *B67D 1/045* (2013.01); *B65D 25/38* (2013.01); *C12H 1/22* (2013.01); *B65D 90/38* (2013.01)

(58) Field of Classification Search
CPC ........ B65D 25/38; B65D 88/62; B65D 90/38; B67D 1/04; B67D 1/045; C12H 1/22
(Continued)

(56) References Cited

U.S. PATENT DOCUMENTS 1,604,257 A * 10/1926 Brooks .................. B65D 90/38
                                              220/567.2
3,981,418 A *  9/1976 Williamson ........... B64G 1/402
                                              222/386.5
(Continued)

FOREIGN PATENT DOCUMENTS

WO    WO2010055057 A1    5/2010
WO    WO2011064294 A1    6/2011

*Primary Examiner* — Paul R Durand
*Assistant Examiner* — Andrew P Bainbridge
(74) *Attorney, Agent, or Firm* — Themis Law

(57) ABSTRACT

A device for protecting a liquid from oxidation inside a container includes a first element supplying the liquid inside the container, a second element supplying the liquid outside the container and a control unit. A pneumatic control system is configured to produce an overpressure inside the container and on the liquid when the liquid is supplied outside the container, such that, following a decrease in the volume of the liquid inside the container, the pneumatic control system increases its volume by an amount equal to the change in the volume of the liquid. The pneumatic control system includes a variable capacity tank and a pipe supplying and discharging a fluid for filling the tank. A system supplying and discharging the filling fluid is connected to the pipe and the supplying and discharging pipe communicates with the variable capacity tank through a connection placed inside the container at its lower end.

7 Claims, 2 Drawing Sheets

(51) Int. Cl.
*B65D 25/38* (2006.01)
*B65D 90/38* (2006.01)

(58) Field of Classification Search
USPC ..... 222/55–56, 52, 386.5, 401, 146.1, 146.6
See application file for complete search history.

(56) References Cited

U.S. PATENT DOCUMENTS

| | | | | |
|---|---|---|---|---|
| 4,818,706 A | * | 4/1989 | Starr | B01L 3/0203 |
| | | | | 222/386.5 |
| 5,048,724 A | * | 9/1991 | Thomas | A23G 3/28 |
| | | | | 222/105 |
| 5,411,179 A | * | 5/1995 | Oyler | B67D 1/0462 |
| | | | | 222/129.1 |
| 5,667,110 A | | 9/1997 | McCann et al. | |
| 5,729,520 A | * | 3/1998 | Klicker | G01N 21/9506 |
| | | | | 369/112.17 |
| 5,868,168 A | * | 2/1999 | Mott | F16L 55/053 |
| | | | | 138/26 |
| 6,129,236 A | * | 10/2000 | Osokin | F15B 1/14 |
| | | | | 220/723 |
| 6,786,364 B2 | * | 9/2004 | McBride | B67D 7/0244 |
| | | | | 222/105 |
| 8,579,156 B2 | * | 11/2013 | Rasmussen | B67D 1/07 |
| | | | | 222/1 |
| 2007/0119875 A1 | | 5/2007 | Ehret et al. | |
| 2009/0095776 A1 | | 4/2009 | Turner et al. | |
| 2011/0101010 A1 | | 5/2011 | Maiocco | |
| 2011/0108575 A1 | * | 5/2011 | Alder | A45F 3/04 |
| | | | | 222/95 |
| 2014/0097182 A1 | * | 4/2014 | Sheesley | B65D 88/62 |
| | | | | 220/1.6 |

* cited by examiner

DEVICE FOR PROTECTING A LIQUID FROM OXIDATION

The present invention relates to a device for protecting a liquid from oxidation inside a container having a first aperture at the upper end and which container comprises first means for supplying the liquid inside the container, second means for supplying the liquid outside the container and a control unit.

There are further provided pneumatic control means at least partially housed into the container and intended to produce an overpressure inside the container and on the liquid when the liquid is supplied outside the container, such that following a decrease in the volume of the liquid inside the container, such pneumatic control means increase their volume by an amount equal to the change in the volume of the liquid.

The pneumatic control means comprise a variable capacity tank and a pipe supplying and discharging a fluid for filling the tank, there being provided means for supplying and discharging the filling fluid which are connected to the pipe.

The present invention is particularly applied in wine storage apparatuses.

Currently it is widely known that the contact with oxygen is among the parameters that negatively affect wine preservation, it is able to irreversibly compromise wine quality. This is particularly true as regards the preservation in containers used for selling wine or for preserving it before bottling, where the volume of the stored liquid may change.

Usually in these cases the containers are composed of vessels made of stainless steel, from which wine is drawn off in amounts depending on needs, resulting in a filling level changeable over time. Generally, when the container is not completely full, air can enter it, causing the wine to spoil.

Methods and apparatuses have been designed for limiting such phenomenon with the aim of overcoming such drawback.

According to a first suggested solution, a container is provided wherein the wine is kept under inert atmosphere, usually under a slight overpressure.

As an alternative, according to another suggested solution, the container is provided to have movable parts equipped with gaskets, which provide to compensate the volume that changes as the liquid is drawn off. An example of such technical solution is described in patent FR2291685.

However such technical solutions mentioned above have the drawback resulting from the fact that there is the risk of acetification/spoilage due to oxidation of the wine held into the container caused by oxygen spreading into the inert gas, or due to migration through leaky gaskets or during the displacement of the floating lid.

These phenomena are particularly clear as regards large capacity tanks.

In response to such drawbacks, some prior art devices use one or more inflatable tanks inserted into the container itself, and wherein such inflatable elements, when inflated, serve for completely filling the empty space left by the liquid drawn off from the container.

Such devices are based on the fact of compensating the volume of liquid missing inside a container by increasing an element inside it by a corresponding volume, without changing the external volume of the container.

An example of such solution is described in documents DE 3511506 or FR 2640594.

However the document DE 3511506 has the drawback of being particularly complicated as regards the constructional point of view above all as regards the replacement of the inflatable tank in case of damage. Such constructional complexity has consequences on adaptability and/or modification problems in using the device and particularly the tank into already existing containers.

In addition to have all these drawbacks the document FR 2640594 provides an elastically expandable tank therein that involves a high risk of being broken and damaged since the fatigue cycles due to the continuous inflation/deflation actions lead to stresses that cause the material of the tank to be torn.

Another solution is shown in the document FR 2587813, however all the devices known in the prior art provide the variable capacity tank to be inserted which is made from the upper aperture of the container, which often leads to malfunctions thereof.

Generally the variable capacity tank is filled with a fluid that has a density lower than the density of the wine contained into the containers, therefore during the inflation step the variable capacity tank tends to raise upwards and in case of high amounts of wine it can also receive a push upwards that causes the connections outside the container to break.

Moreover since it tends to raise upwards the variable capacity tank obstructs the aperture of the container by making it impossible to see the level of wine inside the container.

Therefore there is the unsatisfied need from the prior art for providing a device for protecting a liquid from oxidation that, by means of relatively simple and inexpensive arrangements, can solve the known prior art drawbacks.

The present invention achieves the above aims by providing a device as described hereinbefore, wherein the supplying and discharging pipe is connected to the variable capacity tank through a connection placed inside the container at the lower end of the container, the supplying and discharging pipe being in communication with the inside of the container through a lower aperture placed at the bottom of the container.

There are further provided fastening means placed at the bottom of the container intended to hold in place the variable capacity tank.

The fact of placing the variable capacity tank near the bottom of the container is a very important feature, since the filling fluid during the inflating step fills the variable capacity tank which tends to raise towards the upper aperture of the container, but due to the action of the fastening means, the increase in the dimensions of the variable capacity tank allows an action pushing on the liquid to be accomplished in order to occupy the spaces left by the liquid that has been discharged from the container.

Therefore although the different density of the filling fluid with respect to the liquid inside the container, the variable capacity tank remains still and it has the function of optimally occupying the spaces, annulling the presence of air inside the container.

The fact of placing the variable capacity tank towards the bottom of the container optimizes the pushing action caused by its inflation on the liquid, requiring inflating pressures lower than the prior art known devices.

Such feature is particularly advantageous if considering that containers typically used for the wine are not tested for withstanding high pressures.

It is specified that the fastening means can be composed of any means known in the prior art allowing a tank to be fastened to a wall, but preferably they are composed of one or more chain elements fastened to the bottom of the container and on the external wall of the variable capacity tank.

According to a possible embodiment, the variable capacity tank is an element composed of flexible and stretchable material, having a predetermined volume variable from a specific maximum value, lower than the inner volume of the container, and a specific minimum value, corresponding to the condition with no filling fluid or with the smallest amount of filling fluid inside the tank.

For example the variable capacity tank can be composed of plastic material, such as for example a single-layer polymer.

Moreover the variable capacity tank has a mouth fastened by its peripheral edge to the connection which mouth is intended for the entrance of the filling fluid.

The use of a flexible and variable capacity tank allows the aim of filling the missing volume which was occupied by the drawn off wine to be achieved while keeping optimal operating conditions without involving a damage due to wear or breaking caused by fatigue cycles during the inflating/deflating actions of the tank.

Therefore the tank is already arranged with the volume required, such feature is particularly advantageous in the case of large size containers, that, in case of elastically expandable tank, otherwise would require a considerable change in the volume increasing the likelihood of breaking the tank.

Preferably the variable volume tank is like a bag and it has the mouth placed at the bottom, a perimetral shell wall and a top wall.

Advantageously the variable capacity tank is sealingly connected to the air-tight supplying pipe.

A possible implementation of such configuration is obtained by the variant embodiment according to which the connection that puts the variable capacity tank in communication with the supplying pipe is composed of two flanges connectable with each other, the peripheral edge of the mouth of the variable capacity tank being interposed between such flanges.

According to such arrangement it is possible to provide the fastening means intended to hold the variable capacity tank in a fixed position to be directly connected to the lower flange such that the force pushing the variable capacity tank upwards is discharged on the connection between the flange and the fastening means, without subjecting the material composing the tank to a tensile stress.

Preferably the pipe supplying the filling fluid and the discharging or exhausting one are composed of a single pipe sealingly connected to the variable capacity tank and alternatively connectable by a three-way valve system to the external environment and to the source supplying the filling fluid.

According to a preferred embodiment, the control unit provides a control member for the pressure and/or volume inside said container and which control member can adjust the amount of filling fluid to be supplied/discharged inside said tank by said supplying and discharging means.

Such control member can be for example composed of a slot obtained near the upper aperture of the container, which indicates the liquid level present inside thereof.

The presence of such control member is particularly advantageous in the case of a manual control of the liquid level, since it is possible to control the level through the slot and in the case the level is lower than a predetermined threshold value the user can operate the means supplying and discharging the filling fluid for inflating the variable capacity tank till the liquid reaches the desired level.

As already said above the liquid inside the device of the present invention preferably is wine, that is an "alive" liquid, wherein reactions may change the pressure conditions; to this end the feature just described allows to prevent wine from contacting the oxygen in the case of a decrease in the pressure since the control unit, automatically or manually as it will be explained below, allows the pressure and therefore the volume of the variable capacity tank to be adjusted on the basis of the conditions of the liquid inside the container.

Moreover since generally wine is drawn off by a suction from the inside the container to the outside, a proper control of the pressure inside the container intended to regulate the volume of the tank allows the increase in the volume of the container not only to compensate the missing volume of the liquid but possibly it can also force the liquid to come out of the container such to help in the action drawing off the wine.

To this end the control unit for the pressure and/or volume inside the container can comprise a flow meter for the output liquid.

According to a further variant embodiment, the control unit comprises at least one electronic control unit connected to the supplying and discharging means for the filling fluid, which electronic control unit is intended to generate control signals for adjusting the amount of filling fluid to be supplied/discharged inside the tank.

Such configuration always enables a manual control that is the user acts on the control unit for controlling the supply of filling fluid by the supplying and discharging means.

As an alternative it is possible to provide to automatically keep a specific level.

According to such improvement the control unit comprises at least one sensor detecting the volume of the liquid inside said container, of the level switch-type or the like, such that the generation of the control signals by said electronic control unit occurs automatically on the basis of the liquid level detected by the level switch.

Moreover one of the most advantageous characteristics of the present invention is the adaptability of the device described above in already existing containers.

As it will be seen below by showing some embodiments, the existing containers have an upper aperture intended to house a part of the control unit and a lower aperture allowing the supplying and discharging pipe communicating with the variable capacity tank to sealingly pass through.

Finally the device of the present invention is particularly suitable for making kits to be applied on already existing containers in order to prevent the liquid contained inside said containers from being oxidized.

Therefore an object of the present invention is a kit for making a device for protecting a liquid from oxidation on already existing containers which comprises pneumatic control means composed of a variable capacity tank and a pipe supplying and discharging a fluid for filling the tank and which comprises a control unit.

There are also provided means for supplying and discharging the filling fluid which are connected to the pipe.

Said pneumatic control means, the control unit and the container are made according to one or more of the characteristics described above.

These and other characteristics and advantages of the present invention will be more clear from the following description of some embodiments shown in the annexed drawings wherein.

It is specified that the figures shown below are merely provided for illustrative purposes in order to better understand some characteristics of the device of the present invention and, consequently, they show some embodiments.

However such embodiments have not to be intended as limitative of the inventive concept of the present invention.

Figure 1:
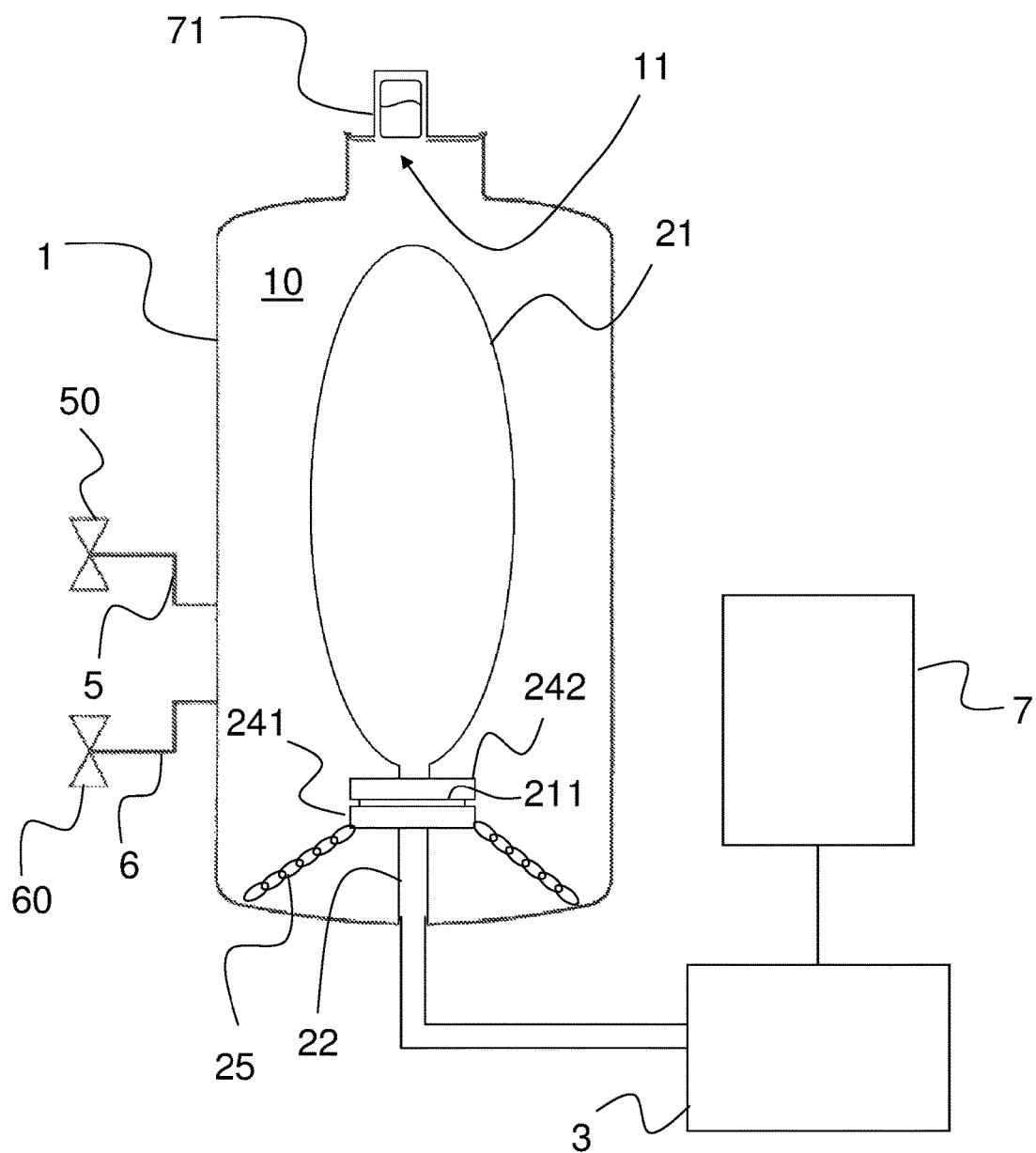
FIG. 1 is a schematic diagram of the device protecting a liquid from oxidation according to the present invention according to a first embodiment.

Particularly FIG. 1 shows the device for protecting a liquid 10 from oxidation inside a container 1 having a first aperture 11 at the upper end and that comprises first means 5, 50 for supplying the liquid 10 inside the container 1, second means 6, 60 for supplying the liquid 10 outside the container 1 and a control unit 7.

It is specified that there is shown a first pipe 5 equipped with on-off valve 50 for introducing the liquid 10 into the container 1, a second pipe 6 equipped with an on-off valve 60, for supplying wine to the outside of the container 1.

The pipes 5 and 6 are intended to enable the normal operating actions of the container 1 such as partial emptying, topping up etc., under safety conditions, and they incorporate additional parts such as relief valves, level gauges, pressure gauges, etc. all being components known in the prior art.

There are further provided pneumatic control means at least partially housed into the container 1 and intended to produce an overpressure inside it and on the liquid 10 when the liquid 10 is supplied outside the container 1, such that following a decrease in the volume of the liquid 10 inside the container 1, the pneumatic control means increase their volume by an amount equal to the change in the volume of the liquid.

This is possible since the pneumatic control means comprise a variable capacity tank 21 and a pipe 22 for supplying and discharging a fluid for filling the tank 21.

The supplying and discharging pipe 22 communicates with the supplying and discharging means 3 for the filling fluid.

Preferably according to variant embodiments shown in the figures, the operation of the supplying and discharging means 3 is regulated by a control unit 7, connected thereto and that will be described below.

The means supplying and discharging the filling fluid for example can be composed of any means known in the prior art, such as pump or compressor or the like, able to pump inside the tank 21 a filling fluid that can be preferably composed of an inert gas not containing oxygen, preferably such as nitrogen or other liquid or gaseous fluids.

With a particular reference to FIG. 1, the supplying and discharging pipe 22 communicates with the variable capacity tank 21 through a connection placed inside the container 1 at the lower end thereof, the supplying and discharging pipe 22 being in communication with the inside of the container 1 through a lower aperture placed at the bottom of said container 1.

There are further provided fastening means 25 placed at the bottom of the container 1 intended to hold in place the variable capacity tank 21.

Figure 2:
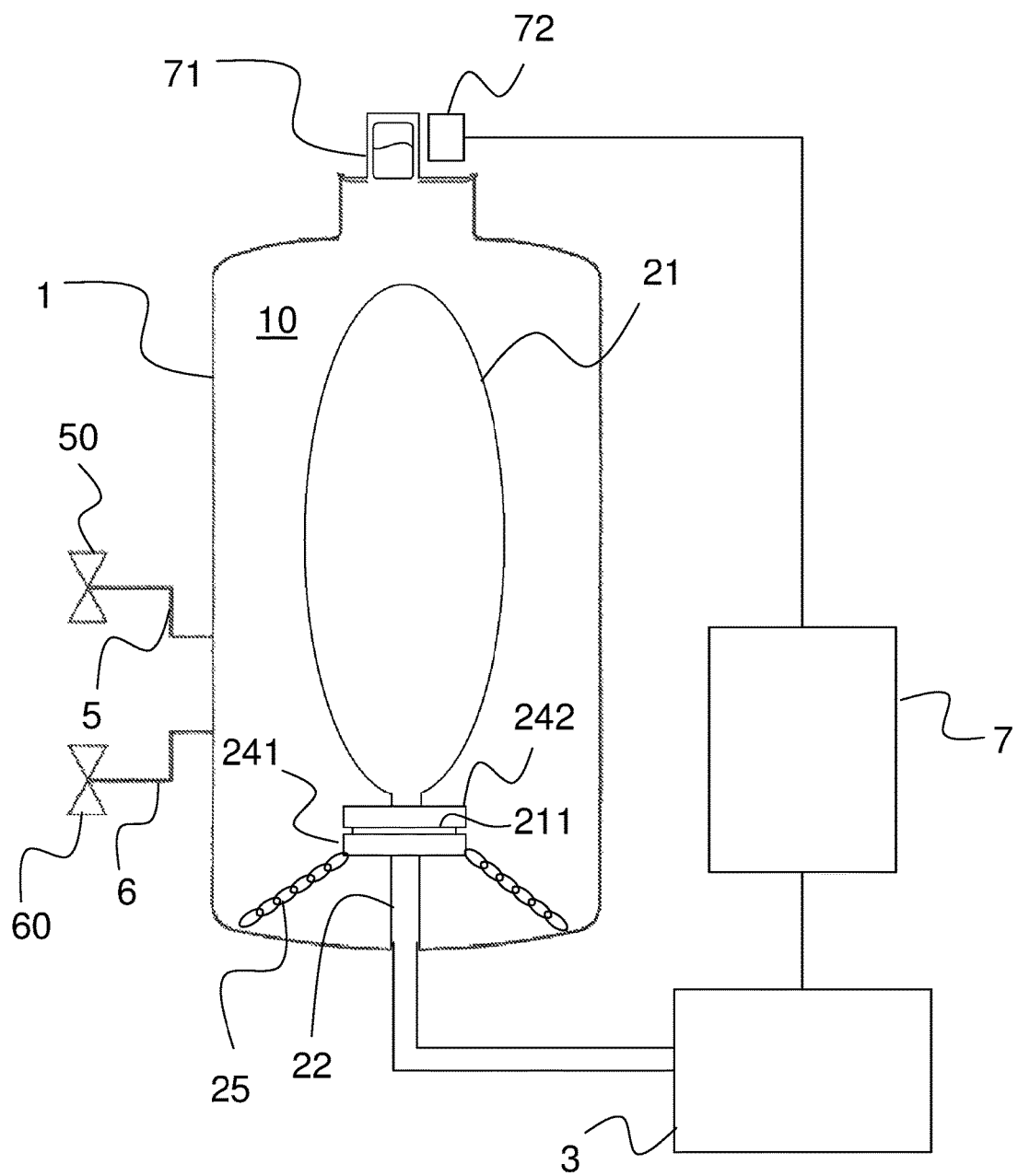
FIG. 2 is a schematic diagram of the device protecting a liquid from oxidation according to the present invention according to a preferred embodiment.

FIG. 1 and FIG. 2 show the supplying and discharging pipe 22 entering into the container 1 through an aperture obtained at the bottom wall of the container 1, allowing the pipe 22 to pass through in a sealing manner.

Also the communication between the supplying pipe 22 and the variable capacity tank 21 obtained through the connection is a sealing communication.

The fastening means 25 in FIG. 1 are composed of chain elements that lock the tank 21 in a given position with respect to the bottom of the container 1, but they can be composed of any means known in the prior art allowing the same function to be accomplished.

The use of chain elements 25 gives to the whole system less stiffness, allowing the tank 21 to make very small fluctuations in order to best adapt itself to the liquid 10 inside the container 1.

Preferably the variable capacity tank 21 is an element composed of flexible and stretchable material, having a predetermined volume variable from a specific maximum value, lower than the inner volume of the container 1, and a specific minimum value, corresponding to the condition with no filling fluid or with the smallest amount of filling fluid inside the tank 21.

Moreover the variable capacity tank 21 has a mouth fastened by its peripheral edge to the connection intended for the entrance of the filling fluid.

With a particular reference to figures, the tank 21 has the shape of a bag, with the mouth placed at the bottom, and it has a perimetral shell wall and a top wall.

It is specified that the variable capacity tank 21 can be composed of a tank of any shape, but preferably it has a shape intended to operatively cooperate with the inner shape of the containers that are usually used in the technological field of interest, which can have for example a cylindrical shape, spherical shape, ellipsoidal shape, bellows-like shape, a parallelepiped shape and a "cushion-like" shape.

Moreover advantageously the variable capacity tank 21 is composed of a plastic material. Particularly the material of the tank is characterized by liquid resistance, impermeability to the gas with which it is internally inflated, and no release of contaminants towards the liquid with which it is in contact.

Generally as regards this last characteristic it is preferred for the material to be approved according to the current regulations as regards contact with foods, such as for example FDA (USA) or EFSA (Europe) or for example according to the Japanese law.

Preferably polymer materials are used which are composed only of one layer in order to maximize the performances while reducing the permeability and guaranteeing the food-grade of the portion in contact with the liquid. Optionally, the insertion of a thin metal layer preferably by metallization, for example with aluminum, is a possible solution.

According to the variant embodiments described in FIG. 1 and FIG. 2 the connection is composed of two flanges 241 and 242 couplable to each other, the peripheral edge 211 of the mouth of the variable capacity tank is interposed between such flanges 241 and 242.

According to such configuration the fastening means 25 are directly connected on the flange 241 such to enable a coupling that does not affect the tank 21 preventing it from being torn.

The two flanges 241 and 242 can be connectable in any manner known in the prior art.

Advantageously the pipe 22 supplying the filling fluid and the discharging or exhausting one are composed of a single pipe 22 sealingly connected to the variable capacity tank 21 and alternatively connectable by a three-way valve system to the outer environment and to the filling fluid supply source.

According to a possible embodiment the control unit 7 provides a control member 71 for the pressure and/or the volume inside the container 1 which regulates the amount of filling fluid to be supplied/discharged inside the tank 21 by the supplying and discharging means 3.

In the particular case of FIGS. 1 and 2 the control member 71 is composed of a cylinder element having at least a transparent part allowing the level of the liquid inside the container to be seen.

The cylinder 71 is housed at least partially inside the container 1 in an air-tight manner through a mouth obtained in the aperture 11 of the container.

Such solution meets the need of using the whole system in already existing containers, but the same function can be accomplished for example with a slot obtained in the external wall of the container 1.

Regardless of the implementation, the control member 71 allows the supply of the filling fluid by the supplying and discharging means 3 to be regulated.

The adjustment can be performed manually or automatically and such variants are shown in FIGS. 1 and 2 respectively.

In FIG. 1 the control unit 7 is composed of an electronic control unit 7 connected to the supplying and discharging means 3 for the filling fluid.

The electronic control unit 7 is intended to generate control signals for adjusting the amount of filling fluid to be supplied/discharged inside the tank 21.

In the particular case shown in FIG. 1 the adjustment is performed manually: the user controls the level of the liquid inside the container through the control member 71, if the level is lower a predetermined value, the user operates the electronic control unit 7 such that it operates the supplying means 3.

The filling fluid begins to enter into the tank 21, which is inflated, it increases its volume and it pushes the liquid till it reaches the desired level.

Now the user stops the supplying means 3 by means of the electronic control unit 7.

As an alternative or in combination it is possible to provide this adjustment to take place automatically, such as shown in FIG. 2.

In this case the control unit comprises at least one sensor 72 detecting the volume of the liquid inside the container 1, of the level switch-type or the like, such that the generation of the control signals by the electronic control unit 7 occurs automatically on the basis of the liquid level detected by the level switch 72.

The invention claimed is:

1. A device for protecting a liquid (10) from oxidation inside a container (1) having a first aperture (11) at an upper end, the container (1) further having a first element (5, 50) supplying said liquid (10) inside said container (1), a second element (6, 60) supplying said liquid (10) outside said container (1), and a control unit (7), the device comprising:
a pneumatic control system at least partially housed into said container (1) and configured to produce an overpressure inside said container (1) and on said liquid (10) when the liquid (10) is supplied outside the container (1), such that following a decrease in volume of said liquid (10) inside said container (1), said pneumatic control system increases in volume by an amount equal to a change in the volume of said liquid (10), said pneumatic control system comprising a variable capacity tank (21) and a pipe (22) supplying and discharging a filling fluid for filling said variable capacity tank (21);
a system (3) supplying and discharging the filling fluid that is connected to said pipe (22),
wherein said supplying and discharging pipe (22) communicates with said variable capacity tank (21) through a connector placed inside the container (1) at a lower end of the container (1), and
wherein said supplying and discharging pipe (22) is in communication with an inside of the container (1) through a lower aperture placed at a bottom of said container (1); and
a fastening system placed at the bottom of said container (1) and configured to hold said connector to said variable capacity tank (21) in place,
wherein said variable capacity tank (21) is an element composed of a flexible and stretchable material, and has a predetermined volume variable from a specific maximum value, lower than an inner volume of said container (1), and a specific minimum value, corresponding to a condition with no filling fluid or with a smallest amount of filling fluid inside said variable capacity tank (21), said variable capacity tank (21) having a mouth fastened by a peripheral edge thereof to said connector configured for entrance of said filling fluid,
wherein said connector comprises two flanges configured to be coupled to each other, and
wherein said peripheral edge of said mouth of said variable capacity tank (21) is interposed between the two flanges.

2. The device according to claim 1, wherein the variable capacity tank (21) is configured as a bag having said mouth placed at a bottom thereof, a perimetric shell, wall and a top wall.

3. The device according to claim 1, wherein the pipe (22) supplying the filling fluid and the discharging pipe are composed of a single pipe (22) sealingly connected to said variable capacity tank (21) and alternatively connectable by a three-way valve system to an outer environment and to a filling fluid supply source.

4. The device according to claim 1, wherein said control unit (7) comprises a control member controlling one or both of pressure and the volume inside said container (1), and wherein the control member adjusts an amount of filling fluid to be supplied/discharged into said tank (21) by said supplying and discharging system.

5. The device according to claim 1, wherein said control unit (7) comprises at least one electronic control unit connected to said supplying and discharging system (3) for the filling fluid, and wherein the electronic control unit is configured to generate control signals for adjusting an amount of filling fluid to be supplied/discharged inside said tank (21).

6. The device according to claim 5, wherein said control unit (7) comprises at least one sensor detecting the volume of the liquid inside said container (1), such that generation of said control signals by said electronic control unit occurs automatically based on a liquid level detected by at least one sensor.

7. A kit for making a device for protecting a liquid from oxidation on an already existing container (1) comprising:
a pneumatic control system comprising a variable capacity tank (21) and a pipe (22) supplying and discharging a fluid filling said variable capacity tank (21);
a control unit (7);
a system supplying and discharging the filling fluid which is connected to said pipe (22) with a connector; and a fastening system placed at the bottom of said container (1) and configured to hold said connector to said variable capacity tank (21) in place, wherein said pneumatic control system is at least partially housed into said container (1) and configured to produce an overpressure inside said container (1) and on said liquid (10) when said liquid (10) is supplied outside the container (1), such that following a decrease in volume of said liquid (10) inside said container (1), said pneumatic control system increases in volume by an amount equal to a change in the volume of said liquid (10), said pneumatic control system comprising said variable capacity tank (21) and said pipe (22) supplying and discharging said filling fluid for filling said variable capacity tank (21), wherein said pipe (22) communicates with said variable capacity tank (21) through a connector placed inside the container (1) at a lower end of the container (1), wherein said supplying and discharging pipe (22) is in communication with an inside of the container (1) through a lower aperture placed at a bottom of said container (1), wherein said variable capacity tank (21) is an element composed of a flexible and stretchable material, and has a predetermined volume variable from a specific maximum value, lower than an inner volume of said container (1), and a specific minimum value, corresponding to a condition with no filling fluid or with a smallest amount of filling fluid inside said variable capacity tank (21), said variable capacity tank (21) having a mouth fastened by a peripheral edge thereof to said connector configured for entrance of said filling fluid, wherein said connector comprises two flanges configured to be coupled to each other, and wherein said peripheral edge of said mouth of said variable capacity tank (21) is interposed between the two flanges.

\* \* \* \* \*